United States Patent
Sohn et al.

(10) Patent No.: US 8,745,363 B2
(45) Date of Patent: Jun. 3, 2014

(54) BOOTABLE VOLATILE MEMORY DEVICE, MEMORY MODULE AND PROCESSING SYSTEM COMPRISING BOOTABLE VOLATILE MEMORY DEVICE, AND METHOD OF BOOTING PROCESSING SYSTEM USING BOOTABLE VOLATILE MEMORY DEVICE

(75) Inventors: Han-gu Sohn, Suwon-si (KR); Young-tack Jin, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 454 days.

(21) Appl. No.: 12/956,165

(22) Filed: Nov. 30, 2010

(65) Prior Publication Data

US 2011/0161647 A1    Jun. 30, 2011

(30) Foreign Application Priority Data

Dec. 30, 2009    (KR) ........................ 10-2009-0134913

(51) Int. Cl.
*G06F 9/00*    (2006.01)
*G06F 9/44*    (2006.01)

(52) U.S. Cl.
CPC .................................. *G06F 9/4401* (2013.01)
USPC .................................... 713/1; 713/2; 713/100

(58) Field of Classification Search
USPC ................................................ 713/1, 2, 100
See application file for complete search history.

(56) References Cited

U.S. PATENT DOCUMENTS

| | | | |
|---|---|---|---|
| 6,807,630 B2 * | 10/2004 | Lay et al. ........................... | 713/2 |
| 6,877,076 B1 * | 4/2005 | Cho et al. ....................... | 711/157 |
| 2003/0142561 A1 * | 7/2003 | Mason et al. .................. | 365/200 |
| 2007/0016763 A1 * | 1/2007 | Koyama et al. .................... | 713/1 |
| 2007/0098022 A1 * | 5/2007 | Furuta ........................... | 370/503 |
| 2008/0152185 A1 * | 6/2008 | Puckette ....................... | 381/394 |
| 2010/0312998 A1 * | 12/2010 | Walker ......................... | 712/221 |

FOREIGN PATENT DOCUMENTS

| | | |
|---|---|---|
| KR | 1020080023408 A | 3/2008 |
| KR | 1020080103183 A | 11/2008 |
| KR | 1020080111745 A | 12/2008 |

* cited by examiner

*Primary Examiner* — Paul Yanchus, III
(74) *Attorney, Agent, or Firm* — Volentine & Whitt, PLLC

(57) ABSTRACT

A bootable volatile memory device comprises a volatile memory area configured to be written to and read from by a host processor, a boot code area configured to store bootstrap code before a boot procedure is performed by the host processor, a first chip select terminal configured to output a signal used as a chip select signal where the host processor performs the boot procedure by reading the bootstrap code from the boot code area, and a second chip select terminal configured to output a signal used as a chip select signal where the host processor writes and reads data to and from the volatile memory area.

21 Claims, 2 Drawing Sheets

BOOTABLE VOLATILE MEMORY DEVICE, MEMORY MODULE AND PROCESSING SYSTEM COMPRISING BOOTABLE VOLATILE MEMORY DEVICE, AND METHOD OF BOOTING PROCESSING SYSTEM USING BOOTABLE VOLATILE MEMORY DEVICE

CROSS-REFERENCE TO RELATED APPLICATIONS

This application claims priority under 35 U.S.C. §119 to Korean Patent Application No. 10-2009-0134913 filed on Dec. 30, 2009, the disclosure of which is hereby incorporated by reference in its entirety.

BACKGROUND

Embodiments of the inventive concept relate generally to electronic memory technologies. More particularly, embodiments of the inventive concept relate to bootable volatile memory devices, memory modules and processing systems comprising the bootable volatile memory devices, and methods of booting processing systems using the bootable volatile memory devices.

A processor in a processing system performs a boot procedure by reading bootstrap code from a nonvolatile memory, such as a flash memory or a read-only memory (ROM), executing the bootstrap code to initialize a volatile memory, copying boot code to the volatile memory, and executing the boot code from the volatile memory.

Although the volatile memory is used to read and write data in a boot procedure, the volatile memory does not store booting information such as the bootstrap code. Accordingly, to boot the processing system, the processor must access the nonvolatile memory in which the bootstrap code is stored before accessing the volatile memory. However, because the time required to access a nonvolatile memory is generally much longer than that required to access a volatile memory, accessing the nonvolatile memory can pose a performance bottleneck for the boot procedure.

SUMMARY

Embodiments of the inventive concept provide a bootable volatile memory device that allows a processor of a processing system to perform a boot procedure by accessing a volatile memory in which bootstrap code is stored, and a memory module comprising the bootable volatile memory device. Embodiments of the inventive concept also provide a processing system comprising the bootable volatile memory device, and methods of booting the processing system using the bootable volatile memory device.

According to one embodiment of the inventive concept, a bootable volatile memory device comprises a volatile memory area configured to be written to and read from by a host processor, a boot code area configured to store bootstrap code before a boot procedure is performed by the host processor, a first chip select terminal configured to output a signal used as a chip select signal where the host processor performs the boot procedure by reading the bootstrap code from the boot code area, and a second chip select terminal configured to output a signal used as a chip select signal where the host processor writes and reads data to and from the volatile memory area.

In certain embodiments, the bootstrap code in the boot code area is accessed by the host processor upon performing a wake-up or software power-off recovery operation.

In certain embodiments, the boot code area is part of a shared area that is accessible by a plurality of processors.

In certain embodiments, the volatile memory comprises a common interface/protocol used by a dynamic random access memory and a flash memory.

In certain embodiments, the common interface/protocol is a low-power double-data-rate 2 standard protocol.

In certain embodiments, the host processor comprises a central processing unit.

According to another embodiment of the inventive concept, an electronic system comprises a volatile memory comprising a volatile memory area configured to be written to and read from by a host processor, a boot code area configured to store the bootstrap code before a boot procedure is performed by the host processor, a first chip select terminal configured to output a signal used as a chip select signal where the host processor performs the boot procedure by reading the bootstrap code from the boot code area, and a second chip select terminal configured to output a signal used as a chip select signal where the host processor writes and reads data to and from the volatile memory area. The electronic system further comprises a control unit that reads the bootstrap code from a storage device and stores the bootstrap code in the boot code area of the volatile memory before a boot procedure is performed by the host processor.

In certain embodiments, the bootstrap code stored in the boot code area is accessed by the host processor in response to a wake-up or software power-off recovery operation.

In certain embodiments, the storage device comprises a flash memory.

In certain embodiments, the boot code area is part of a shared area that is accessible by a plurality of processors.

In certain embodiments, the control unit controls the boot procedure to be performed by the host processor after the bootstrap code is read from the storage device and stored in the boot code area of the volatile memory.

In certain embodiments, the control unit controls the boot procedure by stopping a power supply to the host processor using a reset signal or a power management chip.

In certain embodiments, the volatile memory comprises a common interface/protocol used by a dynamic random access memory and a flash memory.

In certain embodiments, the control unit comprises an application-specific integrated circuit.

In certain embodiments, the common interface/protocol is a low-power double-data-rate 2 standard protocol.

In certain embodiments, the electronic system further comprises the host processor.

In certain embodiments, the host processor comprises a central processing unit and the control unit comprises an application-specific integrated circuit.

According to still another embodiment of the inventive concept, a method is provided for booting a processing system that comprises host processor, a control unit, and a volatile memory. The volatile memory comprises a volatile memory area configured to be written to and read from by the host processor, a boot code area configured to store the bootstrap code before a boot procedure is performed by the host processor, a first chip select terminal, and a second chip select terminal. The method comprises operating the control unit to read the bootstrap code from a storage device and storing the bootstrap code in the boot code area of the volatile memory, and operating the host processor to perform a boot procedure by reading the bootstrap code from the boot code area of the volatile memory through the first chip select terminal.

In certain embodiments, the storage device comprises a flash memory device.

In certain embodiments, the volatile memory interfaces with the host processor and the flash memory device using a common interface/protocol.

BRIEF DESCRIPTION OF THE DRAWINGS

The drawings illustrate selected embodiments of the inventive concept. In the drawings, like reference numbers indicate like features.

DETAILED DESCRIPTION OF EMBODIMENTS

Embodiments of the inventive concept are described below with reference to the accompanying drawings. These embodiments are presented as teaching examples and should not be construed to limit the scope of the inventive concept.

Figure 1:
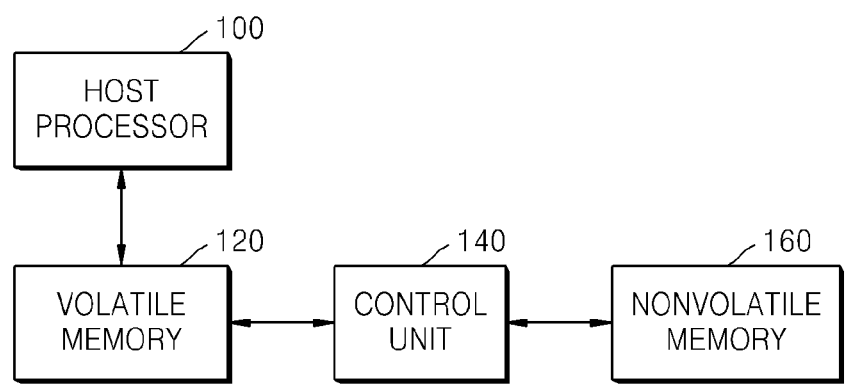
FIG. 1 is a block diagram a processing system comprising a bootable volatile memory device according to an embodiment of the inventive concept.
Figure 2:
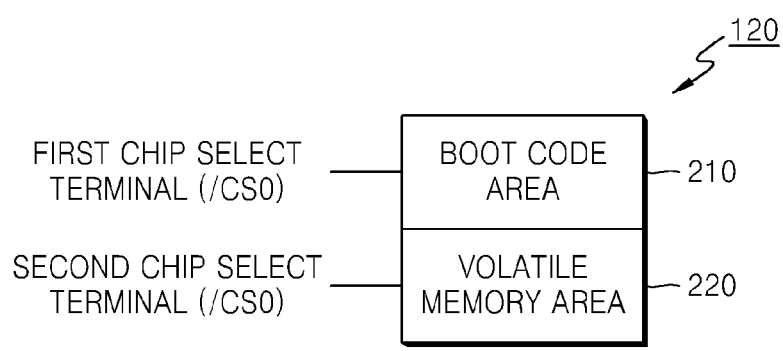
FIG. 2 is a block diagram of a bootable volatile memory in FIG. 1 according to an embodiment of the inventive concept.

FIG. 1 is a block diagram of a processing system comprising a bootable volatile memory device according to an embodiment of the inventive concept.

Referring to FIG. 1, the processing system comprises a volatile memory 120, a host processor 100, a control unit 140, and a nonvolatile memory 160.

Volatile memory 120 comprises a volatile memory area 220, a boot code area 210, a first chip select terminal /CS0, and a second chip select terminal /CS1. Volatile memory 120 stores bootstrap code before a boot procedure starts when a processing system is turned on or restarts. In some embodiments, volatile memory 120 comprises a dynamic random access memory (DRAM).

Volatile memory area 220 is a general data storage area where data is written and read by host processor 100. The data in volatile memory area 220 can comprise, for instance, operating system (OS) code, application code, or user data.

Boot code area 210 is a memory area in which bootstrap code is stored before a boot procedure is performed by host processor 100.

Host processor 100 applies a chip select signal to first chip select terminal /CS0 to read bootstrap code from boot code area 210 in a boot procedure. Host processor 100 applies a chip select signal to second chip select terminal /CS1 to write and read data to and from volatile memory area 220.

Where host processor 100 applies the chip select signal to first chip select terminal /CS0, volatile memory 120 is accessed as if it were a nonvolatile memory, such as a flash memory. Where host processor 100 applies the chip select signal to second chip select terminal /CS1, volatile memory 120 is accessed as a general volatile memory, such as a DRAM. Accordingly, host processor 100 can interface with volatile memory 120 using a common interface/protocol, such as a low-power double-data-rate 2 (LPDDR2) standard protocol.

LPDDR2 is a next-generation low-power memory technology intended to enhance the design of mobile devices and embedded devices defined by companies participating in standard setting activity of the joint electron devices engineering council (JEDEC). LPDDR2 offers higher speed, lower power, larger capacity, and lower pin count than many conventional technologies, and enables nonvolatile memory and DRAM to share the same bus. LPDDR2 can be used, for instance, in mobile device such as mobile internet devices, netbooks, and high performance smartphones.

A chipset (not shown) for controlling and managing a device in the processing system can manage volatile memory 120 as a boot device where a boot code is stored, and as a general DRAM device by using first and second chip select terminals /CS0 and /CS1. Where necessary, signals output from first and second chip select terminals /CS0 and /CS1 can be used as most significant bits (MSBs) where host processor 100 addresses one volatile memory.

Host processor 100 performs a boot procedure by reading the bootstrap code stored in volatile memory 120. Host processor 100 can comprise a central processing unit (CPU) that starts the boot procedure in response to a power up operation of the processing system. As examples, host processor 100 can be a CPU of a digital device such as a mobile terminal, a digital camera, or a computer.

Before the boot procedure is performed by host processor 100, control unit 140 reads the bootstrap code from a storage device, such as nonvolatile memory 160, and copies the bootstrap code to boot code area 210 of volatile memory 120. Control unit 140 can comprise an application-specific integrated circuit (ASIC) for controlling a plurality of NAND flash memories in a system comprising the plurality of NAND flash memories. Alternatively, control unit 140 can function with the support of an ASIC.

The bootstrap code stored in boot code area 210 is directly accessed by host processor 100 after a wake-up operation or software power-off recovery.

Nonvolatile memory 160 can comprise a flash memory or other type of nonvolatile memory.

In some embodiments, volatile memory 120 can be accessed by a plurality of processors via different ports. In such embodiments, boot code area 210 can form part of a shared area that is accessible by the plurality of processors.

Volatile memory 120 and control unit 140 can be configured to form a memory module that is bootable and volatile. The memory module can further comprise nonvolatile memory 160 and other elements.

Figure 3:
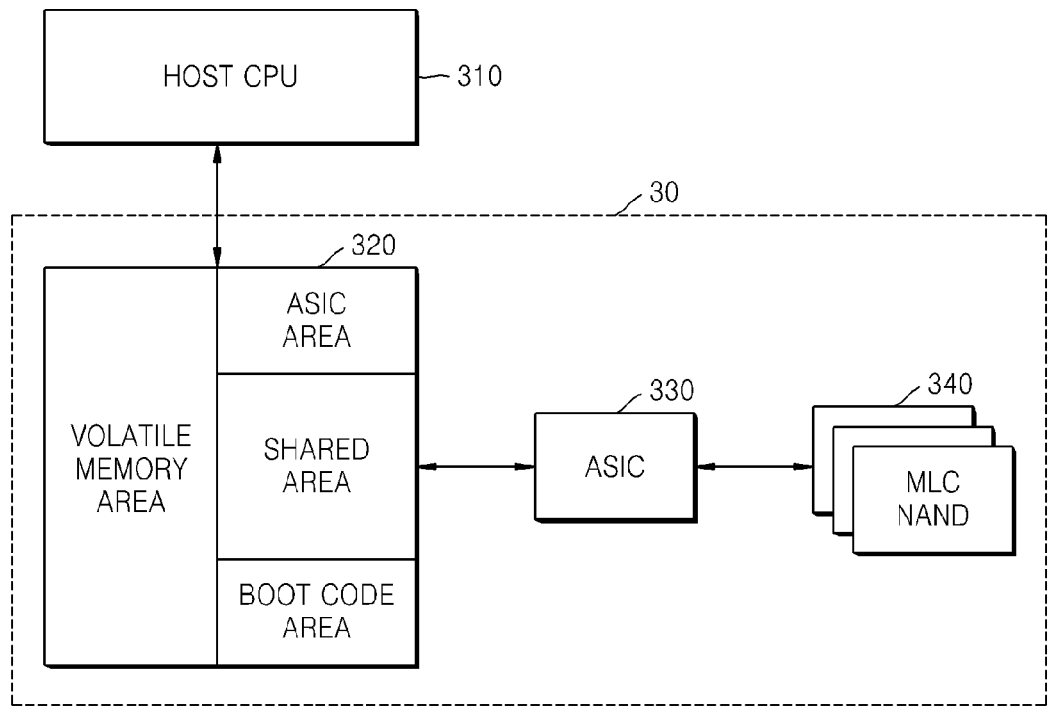
FIG. 3 is a block diagram illustrating a variation of the processing system of FIG. 1.

FIG. 3 is a block diagram illustrating a variation of the processing system of FIG. 1. In FIG. 3, a host CPU 310 corresponds to host processor 100, a volatile memory 320 corresponds to volatile memory 120, an ASIC 330 corresponds to control unit 140, and a multi-level cell (MLC) NAND flash memory 340 corresponds to nonvolatile memory 160. Volatile memory 320, ASIC 330, and MLC NAND flash memory 340 form a memory module 30, which is a bootable volatile memory module.

Referring to FIG. 3, a digital device, such as a mobile phone or a digital camera, comprises volatile memory 320 and MLC NAND flash memory 340. Volatile memory 320 is divided into a dedicated memory area accessible to one processor and a shared memory area accessible to a plurality of processors.

ASIC 330 controls MLC NAND flash memory 340. ASIC 330 reads the bootstrap code from MLC NAND flash memory 340 and copies and stores the bootstrap code to a boot code area of volatile memory 320 before a boot procedure is performed by host CPU 310.

Figure 4:
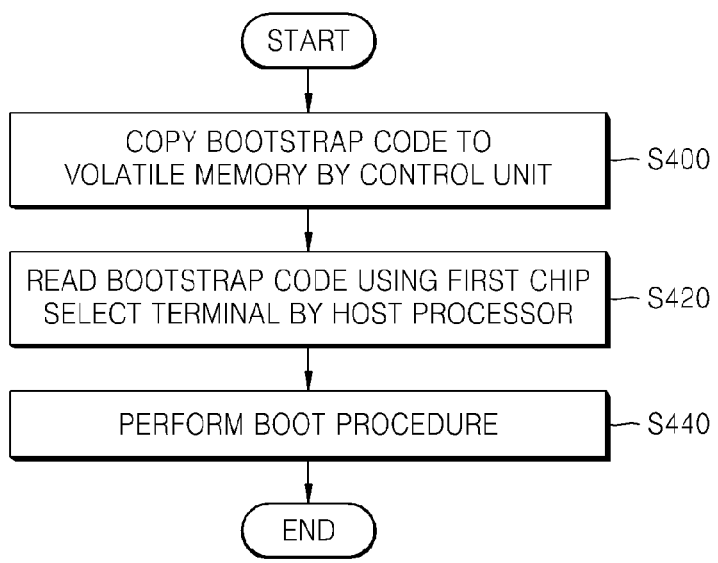
FIG. 4 is a flowchart illustrating a method of booting a processing system using a bootable volatile memory device according to an embodiment of the inventive concept.

FIG. 4 is a flowchart illustrating a method of booting the processing system of FIG. 1 according to an embodiment of the inventive concept.

Referring to FIG. 4, in an operation S400, control unit 140 reads a bootstrap code from nonvolatile memory 160 and copies and stores the bootstrap code to boot code area 210 of volatile memory 120. In order to copy the bootstrap code to boot code area 210 before host processor 100 performs a boot procedure, control unit 140 can cause a power-on reset to be performed on host processor 100 only after the bootstrap code is copied to boot code area 210 by using a reset signal output from a reset terminal /RESET of host processor 100. In some alternative embodiments, control unit 140 can stop the power supply to host processor 100 using a power management integrated circuit (MMIC) and resume the power supply only after the bootstrap code is copied to boot code area 210. In still other embodiments, other methods can be used by control unit 140 to copy the bootstrap code to boot code area 210 before host processor 100 performs the boot procedure.

In operation S420, host processor 100 reads the bootstrap code stored in boot code area 210 of volatile memory 120 through first chip select terminal /CS0. In operation S440, a boot procedure is performed. The boot procedure can be performed in various ways understood by those skilled in the art.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A bootable volatile memory device comprising:
a volatile memory area configured to be written to and read from by a host processor;
a boot code area configured to store bootstrap code before a boot procedure is performed by the host processor;
a first chip select terminal configured to receive a signal used as a chip select signal where the host processor performs the boot procedure by reading the bootstrap code from the boot code area; and
a second chip select terminal configured to receive a signal used as a chip select signal where the host processor writes and reads data to and from the volatile memory area;
wherein the bootstrap code is copied from a nonvolatile memory to the boot code area by a control unit before the boot procedure starts; and
wherein the control unit causes a power-on reset to be performed on the host processor after the bootstrap code is copied from the nonvolatile memory to the boot code area.

2. The bootable volatile memory device of claim 1, wherein the bootstrap code in the boot code area is accessed by the host processor upon performing a wake-up or software power-off recovery operation.

3. The bootable volatile memory device of claim 1, wherein the boot code area is part of a shared area that is accessible by a plurality of processors.

4. The bootable volatile memory device of claim 1, wherein the volatile memory comprises a common interface/protocol used by a dynamic random access memory (DRAM) and a flash memory.

5. The bootable volatile memory device of claim 4, wherein the common interface/protocol is a low-power double-data-rate 2 (LPDDR2) standard protocol.

6. The bootable volatile memory device of claim 1, wherein the host processor comprises a central processing unit.

7. An electronic system, comprising:
a volatile memory comprising a volatile memory area configured to be written to and read from by a host processor, a boot code area configured to store the bootstrap code before a boot procedure is performed by the host processor, a first chip select terminal configured to receive a signal used as a chip select signal where the host processor performs the boot procedure by reading the bootstrap code from the boot code area, and a second chip select terminal configured to receive a signal used as a chip select signal where the host processor writes and reads data to and from the volatile memory area; and
a control unit that copies the bootstrap code from a storage device to the boot code area of the volatile memory before the host processor starts performing the boot procedure, wherein the control unit causes a power-on reset to be performed on the host processor after the copy of the bootstrap code in the boot code area.

8. The electronic system of claim 7, wherein the bootstrap code stored in the boot code area is accessed by the host processor in response to a wake-up or software power-off recovery operation.

9. The electronic system of claim 7, wherein the storage device comprises a flash memory.

10. The electronic system of claim 7, wherein the boot code area is part of a shared area that is accessible by a plurality of processors.

11. The electronic system of claim 7, wherein the control unit controls the boot procedure to be performed by the host processor after the bootstrap code is read from the storage device and stored in the boot code area of the volatile memory.

12. The electronic system of claim 11, wherein the control unit controls the boot procedure by stopping a power supply to the host processor using a reset signal or a power management chip.

13. The electronic system of claim 7, wherein the volatile memory comprises a common interface/protocol used by a dynamic random access memory and a flash memory.

14. The electronic system of claim 7, wherein the control unit comprises an application-specific integrated circuit.

15. The electronic system of claim 13, wherein the common interface/protocol is a low-power double-data-rate 2 (LPDDR2) standard protocol.

16. The electronic system of claim 7, further comprising the host processor.

17. The electronic system of claim 16, wherein the host processor comprises a central processing unit and the control unit comprises an application-specific integrated circuit.

18. A method of booting a processing system that comprises host processor, a control unit, and a volatile memory comprising a volatile memory area configured to be written to and read from by the host processor, a boot code area configured to store the bootstrap code before a boot procedure is performed by the host processor, a first chip select terminal, and a second chip select terminal, the method comprising:
operating the control unit to copy the bootstrap code from a storage device to the boot code area of the volatile memory before the boot procedure starts;
operating the host processor to start performing the boot procedure by reading the bootstrap code from the boot code area of the volatile memory through the first chip select terminal; and operating the control unit to cause a power-on reset to be performed on the host processor after the copy of the bootstrap code in the boot code area.

19. The method of claim 18, wherein the storage device comprises a flash memory device.

20. The method of claim 19, wherein the volatile memory interfaces with the host processor and the flash memory device using a common interface/protocol.

21. The bootable volatile memory device of claim 1, wherein the volatile memory device uses an interface/protocol for a nonvolatile memory where the volatile memory device receives a chip select signal through the first chip select terminal.

* * * * *